United States Patent

[11] 3,580,665

| [72] | Inventor | Marvin Ben Bassett |
| | | Randolph, Mass. |
| [21] | Appl. No. | 722,399 |
| [22] | Filed | Apr. 18, 1968 |
| [45] | Patented | May 25, 1971 |
| [73] | Assignee | Technicolor, Inc. |
| | | Hollywood, Calif. |

[54] METHOD FOR REMOVING FILM FROM A FILM CARTRIDGE
1 Claim, 7 Drawing Figs.

[52] U.S. Cl. .................................................. 352/78, 206/52
[51] Int. Cl. ................................................... G03b 23/02
[50] Field of Search ........................................
206/(Inquired), 52, 58; 352/78, 129

[56] References Cited
UNITED STATES PATENTS

| 930,037 | 8/1909 | Brown | 352/129 |
| 1,460,435 | 7/1923 | Newman | 352/78(UX) |
| 1,694,401 | 12/1928 | Slocum | 206/52F(UX) |
| 1,800,911 | 4/1931 | Smith | 206/52X |
| 1,829,577 | 10/1931 | Anderson | 206/52X |
| 1,904,097 | 4/1933 | Steiner | 352/78X |
| 3,405,797 | 10/1968 | Dwyer | 206/52 |

FOREIGN PATENTS

| 607,883 | 4/1926 | France | 206/52 |

Primary Examiner—Samuel S. Matthews
Assistant Examiner—Monroe H. Hayes
Attorney—Roberts, Cushman and Grover ABSTRACT: Peeling back an edge of the cartridge exposure window far enough to relieve the film from any pressure or friction from the pressure plate and the edge of the exposure window, so that the film may be pulled obliquely from the cartridge without being scratched.

PATENTED MAY25 1971

3,580,665

Inventor
Marvin Ben.Bassett
by Roberts, Cushman & Grover
Attys

3,580,665

METHOD FOR REMOVING FILM FROM A FILM CARTRIDGE

Objects of the invention are to provide a simplified method of unspooling exposed film from a sealed plastic cartridge in which the preliminary steps can be carried out in the light and thereby making it easier and safer to accomplish.

In exposing cinematographic film it is moved between exposures past first and second edges of the exposure window. In one aspect the present invention involves a method which comprises bending said second edge outwardly enough to relieve any friction against the film in the area of the second edge, without fogging the exposed area of the film, whereby the film may be labeled in the light and subsequently pulled obliquely from the cartridge in the dark without scratching. The method is practiced with a device comprising a tongue for insertion through the window under said second edge and means for then forcing the edge outwardly to permit the film to be withdrawn without scratching. After said edge is forced out the cartridge is placed in a socket having an open bottom with a trap door, the film is pulled out obliquely so as not to scratch the film and the trap door is opened to permit the cartridge to be dropped by gravity into a disposal container.

For the purpose of illustration typical devices are shown in the accompanying drawings in which FIG. 1 is a side view with a corner broken away of a well-known cartridge;

Figure 1:
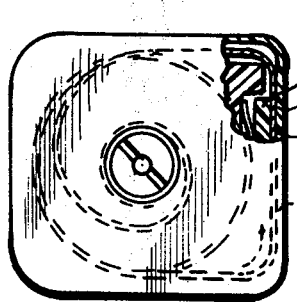
Figure 2:
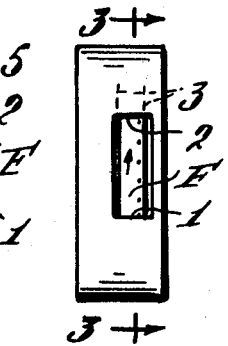
FIG. 2 is a view of the cartridge from the right of FIG. 1.

As shown in FIGS. 1 and 2 the film F feeds in the direction of the arrow past first and second edges 1 and 2 of the exposure window. The usual pressure plate 5 is disposed behind the film to hold the film in the focal plane. After the film has been exposed the trailing end of the film, which can be leader or unexposed film, is in the window. Before the film is withdrawn for processing the trailing end is labeled for identification. Heretofore this has been done by opening the cartridge in a darkroom but of course this can be done better in the light.

Figure 3:
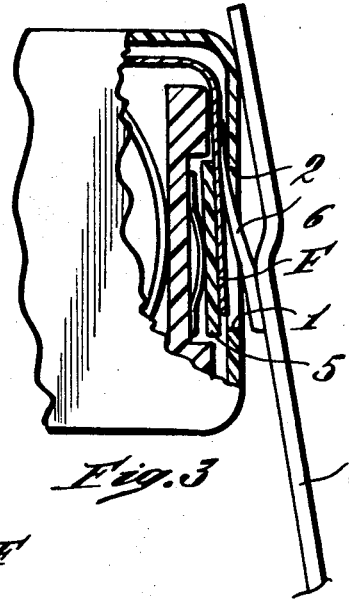
FIG. 3 is an enlarged view like FIG. 1 showing one way of opening the cartridge according to this invention.
Figure 4:
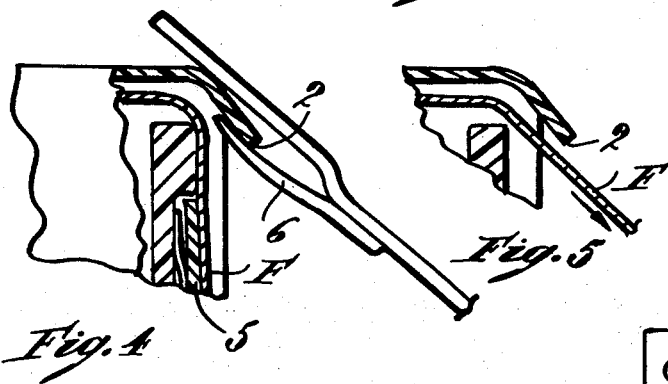
FIG. 4 is a similar view showing the cartridge opened.
Figure 5:
FIG. 5 is a similar view showing how to remove the film from an opened cartridge.
Figure 6:
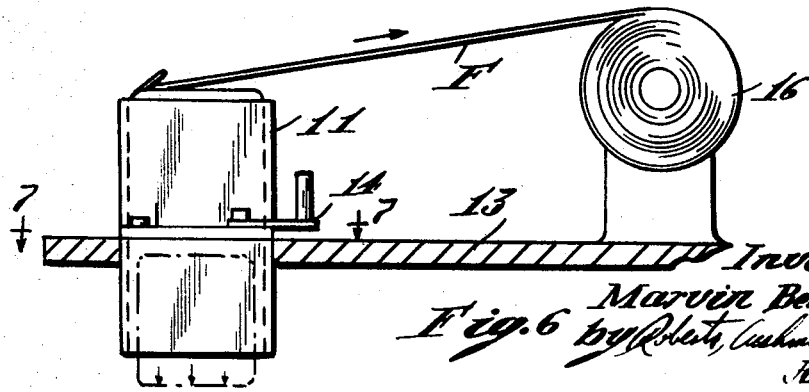
FIG. 6 is a side view of a device for holding the opened cartridge while removing the film from an opened cartridge.

According to this invention the edge 2 is bent outwardly to the position shown in FIGS. 3 and 6 to permit the end of the film to be pulled out enough to be labeled but not enough to fog the exposed portion of the film. In this operation the cartridge case is sheared along the broken lines 3 in FIG. 2. A simple device for this purpose comprises a bar having a thin tongue 6 to be inserted under the edge 2 as shown in FIG. 3 after which the bar is swung out to the position shown in FIG. 4. After labeling the end of the film the cartridge is taken to a darkroom and the film is pulled out obliquely as shown in FIG. 5 so as not to scratch the film.

Figure 7:
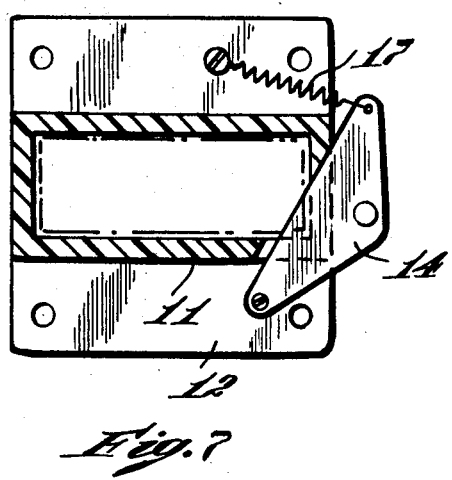
FIG. 7 is a section on line 7-7 of FIG. 6.

After the edge 2 has been bent out and the film has been labeled, the film may be withdrawn in a darkroom with a device such as shown in FIGS. 6 and 7. This device comprises a socket 11 having a flange 12 for mounting in an opening in a table 13. The socket has a trap door 14 to support the cartridge in the position shown in FIG. 6 while the film is being wound on a reel 16. After the film has been withdrawn the trap door is turned against the action of spring 17 to permit the empty cartridge to drop form the socket.

It should be understood that the present disclosure is for the purpose of illustration only and that this invention includes all modifications and equivalents which fall within the scope of the appended claims.

I claim:

1. For removing film from a cartridge of the type having an exposure window past which the film may be moved first past one edge of the window and thence past a second edge of the window, the method which comprises severing the cartridge along lines extending from said second edge away from the window adjacent the sides of the window to form a tongue and bending the tongue outwardly enough to release the trailing end of the film whereby the film may be pulled out through the window without being scratched by said second edge.